(12) United States Patent
Hung

(10) Patent No.: US 10,718,443 B2
(45) Date of Patent: Jul. 21, 2020

(54) WATER LEVEL CONTROLLER FOR A HYDROPONIC SYSTEM

(71) Applicant: Xin-Yi Hong, Taoyuan (TW)

(72) Inventor: Chin-Ping Hung, Taoyuan (TW)

(73) Assignee: Xin-Yi Hong, Taoyuan (TW)

( * ) Notice: Subject to any disclaimer, the term of this patent is extended or adjusted under 35 U.S.C. 154(b) by 0 days.

(21) Appl. No.: 15/982,460

(22) Filed: May 17, 2018

(65) Prior Publication Data

US 2018/0335160 A1     Nov. 22, 2018

(30) Foreign Application Priority Data

May 18, 2017   (CN) .................... 2017 2 0556775 U

(51) Int. Cl.
  *F16K 21/18*    (2006.01)
  *F16K 31/18*    (2006.01)
  (Continued)

(52) U.S. Cl.
  CPC .......... *F16K 21/185* (2013.01); *A01G 17/005* (2013.01); *A01G 27/003* (2013.01);
  (Continued)

(58) Field of Classification Search
  CPC .... F16K 21/185; F16K 24/042; F16K 24/044; F16K 24/048; F16K 31/18; F16K 31/20; F16K 31/22; F16K 31/24; F16K 33/00; Y10T 137/2536; Y10T 137/2965; Y10T 137/3099; Y10T 137/3068; Y10T 137/7323; Y10T 137/7358; Y10T 137/742; Y10T 137/7439; Y10T 137/7485; G05D 7/0146; G05D 7/0166; G05D 7/0173; G05D 9/02; G05D 16/12; A01G 27/003;
  (Continued)

(56) References Cited

U.S. PATENT DOCUMENTS 2,497,223 A * 2/1950 Landon .................. F16K 31/20
                                                137/245
2,963,037 A * 12/1960 Woodward ................ E03D 1/32
                                                137/416

(Continued)

FOREIGN PATENT DOCUMENTS

WO    WO2013108007 A1    7/2013

*Primary Examiner* — Reinaldo Sanchez-Medina
*Assistant Examiner* — Hailey K. Do
(74) *Attorney, Agent, or Firm* — Muncy, Geissler, Olds & Lowe, P.C.

(57) ABSTRACT

A water level controller for a hydroponic system includes a float shifting upward and downward with the culture solution, a first magnetic attraction element and an inlet valve for feeding in the culture solution. The float includes a seal and a second magnetic attraction element. The seal closes the inlet valve to stop feeding in water when the float ascends to a high water level, and moves way from the inlet valve to start feeding in water at a low water level. The second magnetic attraction element attracts the first magnetic attraction element to keep the seal closing the inlet valve at the high water level and to keep the seal moving away from the inlet valve at the low water level, until the buoyancy of the float is larger than the magnetic attraction between the second and the first magnetic attraction element thereby causing escape from each other.

2 Claims, 8 Drawing Sheets

(51) Int. Cl.
*F16K 24/04* (2006.01)
*A01G 31/02* (2006.01)
*A01G 27/00* (2006.01)
*F16K 31/22* (2006.01)
*F16K 31/26* (2006.01)
*A01G 17/00* (2006.01)
*F16K 31/24* (2006.01)

(52) U.S. Cl.
CPC ............ *A01G 31/02* (2013.01); *F16K 24/048* (2013.01); *F16K 31/18* (2013.01); *F16K 31/22* (2013.01); *F16K 31/24* (2013.01); *F16K 31/26* (2013.01); *Y10T 137/2965* (2015.04); *Y10T 137/3099* (2015.04)

(58) Field of Classification Search
CPC ....... A01G 31/00; A01G 31/02; Y02P 60/216; A47G 2033/1286; A47G 2033/1293; A01K 7/04
See application file for complete search history.

(56) References Cited

U.S. PATENT DOCUMENTS

| | | | | |
|---|---|---|---|---|
| 3,458,085 A | * | 7/1969 | Clemenson | F16K 24/044 137/202 |
| 3,630,221 A | * | 12/1971 | Wilson | A01K 7/04 137/329.05 |
| 3,766,939 A | * | 10/1973 | Reitman | F16K 31/22 137/434 |
| 5,004,405 A | * | 4/1991 | Breslin | F04B 47/08 417/126 |
| 5,090,443 A | * | 2/1992 | Jacobsen | A01G 27/003 137/429 |
| 5,522,179 A | * | 6/1996 | Hollis | A01G 27/003 137/451 |
| 5,611,672 A | * | 3/1997 | Modesitt | F04F 1/06 417/131 |
| 6,966,334 B2 | * | 11/2005 | Bolster | A01G 27/003 137/429 |
| 8,533,995 B1 | | 9/2013 | Fawzi | |
| 9,453,586 B2 | | 9/2016 | Jones | |
| 2005/0115149 A1 | * | 6/2005 | Tanaka | A01G 27/003 47/79 |
| 2013/0019962 A1 | * | 1/2013 | Peters | F16K 31/24 137/409 |
| 2013/0074405 A1 | * | 3/2013 | Sohn | A01G 27/003 47/66.6 |

* cited by examiner

WATER LEVEL CONTROLLER FOR A HYDROPONIC SYSTEM

BACKGROUND OF THE INVENTION a) Field of the Invention

The present invention relates to a water level controller for a hydroponic system, and more particularly to a water level controller for a hydroponic system wherein the technical content thereof involves ascending and descending by buoyancy and positioning by magnetic attraction. By the present invention, the culture solution inside a hydroponic cultivation tank can keep between a high water level and a low water level automatically, and many issues derived from an electronic control system can be overcome.

b) Description of the Prior Art

Hydroponics is a technology of growing plants without using soil. Although in practice a material for supporting a root part of plant, such as perlite, gravel stone, woody fiber, sand grain, foam and mineral wool, may be required, basically the nutrient solution is carried only through water that the plant can be supplied with ingredients needed for growth. Therefore, the hydroponics is also named as soilless culture.

Accordingly, as the hydroponic cultivation does not require soil, there is no need to use farmland requested by the conventional agriculture, and water can be used repeatedly in the hydroponic system. In addition, the nutrient solution can control the nutritional level in the entire production of the plant. Therefore, in comparison to the conventional method for cultivation, the hydroponics is equipped with a lower unit nutritional cost and there will be no issue of environmental contamination by fertilizers. The hydroponics not only produces a steady yield and a high economic value, but also contributes to environmental protection in terms of effective utilization of the water resource.

Considering all kinds of advantages in the abovementioned hydroponics, the present inventor has endeavored in the research, development and implementation of the hydroponic systems for years. However, in the process of implementation, it is found that many shortcomings exist in the water level control for the existing hydroponic technology.

For example, while doing the hydroponics, the root part of plant should be exposed out of a water surface to conduct the respiratory function for a short time. Therefore, many hydroponic systems will use an electronic timer to supply water intermittently to control the water level, or use a water level detector to detect the water level to control the water supply. However, in a damp environment, using the electronic method to control the water level will have a shortcoming that the electronic elements can be damaged easily, and controlling with the electronic elements and electric power can reduce the contribution of the hydroponics to environmental protection.

In related prior arts, the U.S. Pat. No. 9,453,586B2 and WO2013108007A1 provide a structure where a float is disposed in an outer casing. The outer casing is disposed in a hydroponic cultivation tank and is provided with an inlet valve; whereas, the float is provided with a valve plug on a position corresponding to the inlet valve. When the float ascends to a high water level with the water level, the buoyancy is larger than the inlet pressure, which in turn allows the valve plug to abut at the inlet valve and then close the inlet valve. Next, when the water level descends to a level where the buoyancy is smaller than the water pressure at the inlet valve, the water pressure will push the valve plug to open the inlet valve to start supplying water.

The primary issue in the abovementioned structures is that the action of closing the valve plug or opening the inlet valve totally depends on whether the buoyancy that the float is subjected to is larger than the inlet pressure. However, in practice, the buoyancy and the inlet pressure will be affected by all kinds of factors that the water level cannot be controlled accurately. For example, in terms of the inlet pressure, if the culture solution is stored in a container at a higher place, then the size of the container (quality) and the height of the container (potential energy) can all affect the water pressure. Therefore, it will need a constant test in installation to use the hydroponic system.

In another prior art, the design in the U.S. Pat. No. 8,533,995B1 is embedded in soil and hence does not apply to the hydroponic system. However, in addition to using the buoyance, the design also utilizes the magnetic attraction of magnets to assist the float in keeping the valve closed or opened for a short time. In theory, using the magnetic attraction of magnets allows the positioning on closing or opening the valve to be more accurate. However, the problem in the design is that the float and the outer casing are two independent units and there is no connection between the two; therefore, when the float ascends by the buoyancy to close the valve, it is not easy to accurately align the positions of the valve plug and the inlet nozzle. Hence, in that prior art, the inner rim of the outer casing is provided with plural float guides 40 to restrict the float from ascending vertically for alignment. Nevertheless, the float guides are protruded out of the inner rim of the outer casing, which results in two problems. Firstly, as the outer casing is embedded in soil, impurities can enter easily to be locked between the float guides and the float, allowing the float to be stagnated and failed. Secondly, it will also increase the difficulty in manufacturing the outer casing.

SUMMARY OF THE INVENTION

The primary object of the present invention is to provide a water level controller for a hydroponic system. The present invention utilizes the principles of ascending and descending by buoyancy and positioning by magnetic attraction, so that the culture solution inside a hydroponic cultivation tank can keep between a high water level and a low water level accurately and automatically. In addition, many issues derived from the electronic control system or the prior arts can be overcome.

To achieve the abovementioned object, the present invention discloses a water level controller for a hydroponic system, including a hollow casing which is fixed inside a hydroponic cultivation tank, as well as a float which is pivoted in the casing. The present invention is characterized in that a bottom of the casing is connected with the hydroponic cultivation tank and a top of the casing is connected with atmosphere. In addition, the casing is provided with an inlet valve and at least a first magnetic attraction element. The inlet valve includes a water inlet end for feeding in the culture solution from outside, as well as an inlet nozzle which is transfixed into the casing, so that the outer culture solution can pass through the inlet valve to enter the hydroponic cultivation tank, thereby raising the water level.

A side of the float is pivoted in the casing, allowing the other side of the float to shift upward and downward with the water level of the culture solution against the pivot point. In addition, the float is further provided with a second magnetic attraction element and a seal, with the second magnetic attraction element and the seal shifting at a same time.

The said seal is disposed on a position corresponding to the inlet nozzle of the inlet valve, abutting at and closing the inlet nozzle of the inlet valve when the water level in the hydroponic cultivation tank ascends to a high water level, whereas moving away from the inlet valve when the water level descends to a low water level.

The said second magnetic attraction element is disposed on the float, corresponding to the first magnetic attraction element. In addition, the second magnetic attraction element can shift with the float simultaneously. When the high water level is reached, the second magnetic attraction element will approach and attract the first magnetic attraction element to keep the seal closing the inlet valve; and the second magnetic attraction element will escape from the first magnetic attraction element while the water level in the hydroponic cultivation tank descends to the low water level that the gravity of the float is larger than the magnetic attraction between the second magnetic attraction element and the first magnetic attraction element.

The present invention also discloses another water level controller for a hydroponic system, comprising a hollow casing which is fixed in a hydroponic cultivation tank, and a float which is pivoted in the casing. The water level controller is characterized in that a bottom of the casing is connected with the hydroponic cultivation tank, and a top of the casing is connected with atmosphere. In addition, the casing is provided with an inlet valve and at least a first magnetic attraction element. The inlet valve includes a water inlet end for feeding in the culture solution from outside as well as an inlet nozzle which is transfixed into the casing, so that the outer culture solution can pass through the inlet valve to enter the hydroponic cultivation tank, thereby raising the water level.

A side of the float is pivoted in the casing, allowing the other side of the float to shift upward and downward with the water level of the culture solution against the pivot point. In addition, the float is further provided with a second magnetic attraction element and a seal, with the second magnetic attraction element and the seal shifting at a same time.

The said seal is disposed on a position corresponding to the inlet nozzle of the inlet valve, abutting at and closing the inlet nozzle of the inlet valve when the water level in the hydroponic cultivation tank ascends to a high water level, whereas moving away from the inlet valve when the water level descends to a low water level.

The said second magnetic attraction element is disposed on the float, corresponding to the first magnetic attraction element. In addition, the second magnetic attraction element can shift with the float simultaneously. When the low water level is reached, the second magnetic attraction element will approach and attract the first magnetic attraction element to keep the seal moving away from the inlet valve; and the second magnetic attraction element will escape from the first magnetic attraction element while the water level in the hydroponic cultivation tank ascends to the high water level that the buoyancy of the float is larger than the magnetic attraction between the second magnetic attraction element and the first magnetic attraction element.

The present invention still also discloses another water level controller for a hydroponic system, comprising a hollow casing which is fixed in a hydroponic cultivation tank, and a float which is pivoted in the casing. The water level controller is characterized in that a bottom of the casing is connected with the hydroponic cultivation tank, and a top of the casing is connected with atmosphere. In addition, the casing is provided with an inlet valve and two first magnetic attraction elements. The inlet valve is provided with a water inlet end for feeding in the culture solution from outside as well as an inlet nozzle which is transfixed into the casing, so that the outer culture solution can pass through the inlet valve to enter the hydroponic cultivation tank, thereby raising the water level.

A side of the float is pivoted in the casing, allowing the other side of the float to shift upward and downward with the water level of the culture solution against the pivot point. In addition, the float is further provided with two second magnetic attraction elements and a seal, with the two second magnetic attraction elements and the seal shifting at a same time.

The said seal is disposed on a position corresponding to the inlet nozzle of the inlet valve, abutting at and closing the inlet nozzle of the inlet valve when the water level in the hydroponic cultivation tank ascends to a high water level, and moving away from the inlet valve when the water level descends to a low water level.

The said two second magnetic attraction elements are disposed on the float, each corresponding to one of the two first magnetic attraction elements respectively. In addition, one second magnetic attraction element shifts with the float simultaneously, and when the high water level is reached, the second magnetic attraction element will approach and attract the corresponding first magnetic attraction element to keep the seal closing the inlet valve; whereas, the second attraction element will escape from the first magnetic attraction element when the water level in the hydroponic cultivation tank descends to the low water level that the gravity of the float is larger than the magnetic attraction between the second magnetic attraction element and the first magnetic attraction element.

The other second magnetic attraction element shifts with the float simultaneously, and when the low water level is reached, the second magnetic attraction element will approach and attract the corresponding first magnetic attraction element to keep the seal moving away from the inlet valve; whereas, the second attraction element will escape from the first magnetic attraction element when the water level in the hydroponic cultivation tank ascends to the high water level that the buoyancy of the float is larger than the magnetic attraction between the second magnetic attraction element and the first magnetic attraction element.

The abovementioned structures are to enable the second magnetic attraction element to attract the first magnetic attraction element at the high water level or low water level. If the attraction is implemented at the high water level, the seal can keep closing the inlet valve, and the culture solution in the hydroponic cultivation tank will keep descending to the low water level due to absorption by plant or natural evaporation. In the meantime, when the gravity of the float is larger than the magnetic attraction between the second magnetic attraction element and the first magnetic attraction element, the float will displace downward automatically due to the gravity. On the other hand, the second magnetic attraction element and the seal will move away from the first magnetic attraction element and the inlet nozzle of the inlet valve, and the culture solution can pass through the inlet valve again and is filled into the hydroponic cultivation tank automatically, until the abovementioned culture solution in the hydroponic cultivation tank ascends to the high water level again. Therefore, the culture solution in the hydroponic cultivation tank can keep between the high water level and the low water level automatically.

If the abovementioned second magnetic attraction element is disposed on a position to attract the first magnetic attraction element at the low water level, then the seal can keep moving away from the inlet valve. At this time, as the inlet valve is at an inlet condition, the culture solution in the hydroponic cultivation tank will continue ascending. When the culture solution reaches the high water level, the buoyance of the float will be larger than the magnetic attraction between the second magnetic attraction element and the first magnetic attraction element, and the float will displace upward automatically due to the buoyancy. At a same time, the second magnetic attraction element will move away from the first magnetic attraction element, the seal will abut at and close the inlet nozzle of the inlet valve, and the culture solution will stop feeding into the hydroponic cultivation tank, until the abovementioned culture solution in the hydroponic cultivation tank descends to the low water level again. In the meantime, the seal will open the inlet valve, keeping the culture solution in the hydroponic cultivation tank between the high water level and the low water level automatically.

Similarly, if there are two first magnetic attraction elements and two second magnetic attraction elements, and each one can attract the other at the high water level and the low water level, then the seal can keep closing the inlet valve at the high water level, whereas moving away from the inlet valve at the low water level. When the gravity or buoyancy of the float is larger than the magnetic attraction between the second magnetic attraction element and the first magnetic attraction element, the second magnetic attraction element will escape from the first magnetic attraction element, so that the seal can move away from or close the inlet valve, more actually keeping the culture solution in the hydroponic cultivation tank between the high water level and the low water level automatically.

Upon implementation, the casing is in a shape of a hat, wherein the bottom is opened and is connected with the hydroponic cultivation tank, and the top is a top board which is provided at least with an air vent to connect with atmosphere. Or, the casing is in a shape of a scoop, wherein the top is opened and is connected with atmosphere, and the bottom is sealed and is provided at least with an outlet nozzle to connect with the hydroponic cultivation tank.

Upon implementation, the float is in a shape of a hat, with that the bottom can store air to result in buoyancy upon being closed by liquid surface of the culture solution, or the bottom is in a shape of a closed scoop, or an interior of the float is in a shape of an airtight hollow geometry or non-geometry.

Upon implementation, at least a first magnetic attraction element is disposed on the top, side or bottom of the casing; whereas, at least a second magnetic attraction element is disposed on the corresponding top, side or bottom of the float.

Upon implementation, the inlet valve is transfixed into the top board of the hat-shaped casing, allowing the inlet nozzle to be disposed below the top of the casing. A side on the top of the float is provided with a pivoting part which is pivoted below the top board of the casing; whereas, the other side is a movable part which can shift upward and downward with the water level of the culture solution against the pivot point. In addition, the seal is disposed on the top of the movable part, corresponding to the inlet nozzle of the inlet valve.

Upon implementation, the inlet valve is disposed on a side of the casing. The float is extended transversally with a pivoting arm toward the inlet valve. A tail end of the pivoting arm is provided with the abovementioned pivoting part that is pivoted at the casing, and the pivoting part is extended upward with a swinging arm. The abovementioned seal is disposed on the swinging arm, and when the float shifts upward and downward with the water level of the culture solution, the swinging arm will swing against the pivoting part, which in turn enables the seal to approach or move away from the inlet valve.

Upon implementation, at least a second magnetic attraction element is disposed on the bottom of the swinging arm, pivoting arm or float, corresponding to the first magnetic attraction element.

Upon implementation, the said float is further provided at least with a magnet which shifts upward and downward at a same time; whereas, the casing is provided with a magnetic induction element which can induce relatively whether the magnet is at a high water level or a low water level to output the induction signal.

In comparison to the prior arts, the present invention has overcome the issues in the U.S. Pat. No. 9,453,586B2 and WO2013108007A1 that the water level cannot be controlled accurately only by using the float, and has also eliminated the issues in the U.S. Pat. No. 8,533,995B1 that after providing the float guides to restrict the float from ascending vertically for alignment, stains can be attached easily to stagnate the float or that the difficulty in manufacturing the outer casing is increased, in terms of the structural design. Accordingly, the present invention is provided with the advantages of simple structure, accuracy and endurableness.

To enable a further understanding of said objectives and the technological methods of the invention herein, a brief description of the drawings is provided below followed by a detailed description of the preferred embodiments.

DETAILED DESCRIPTION OF THE PREFERRED EMBODIMENTS

Figure 1:
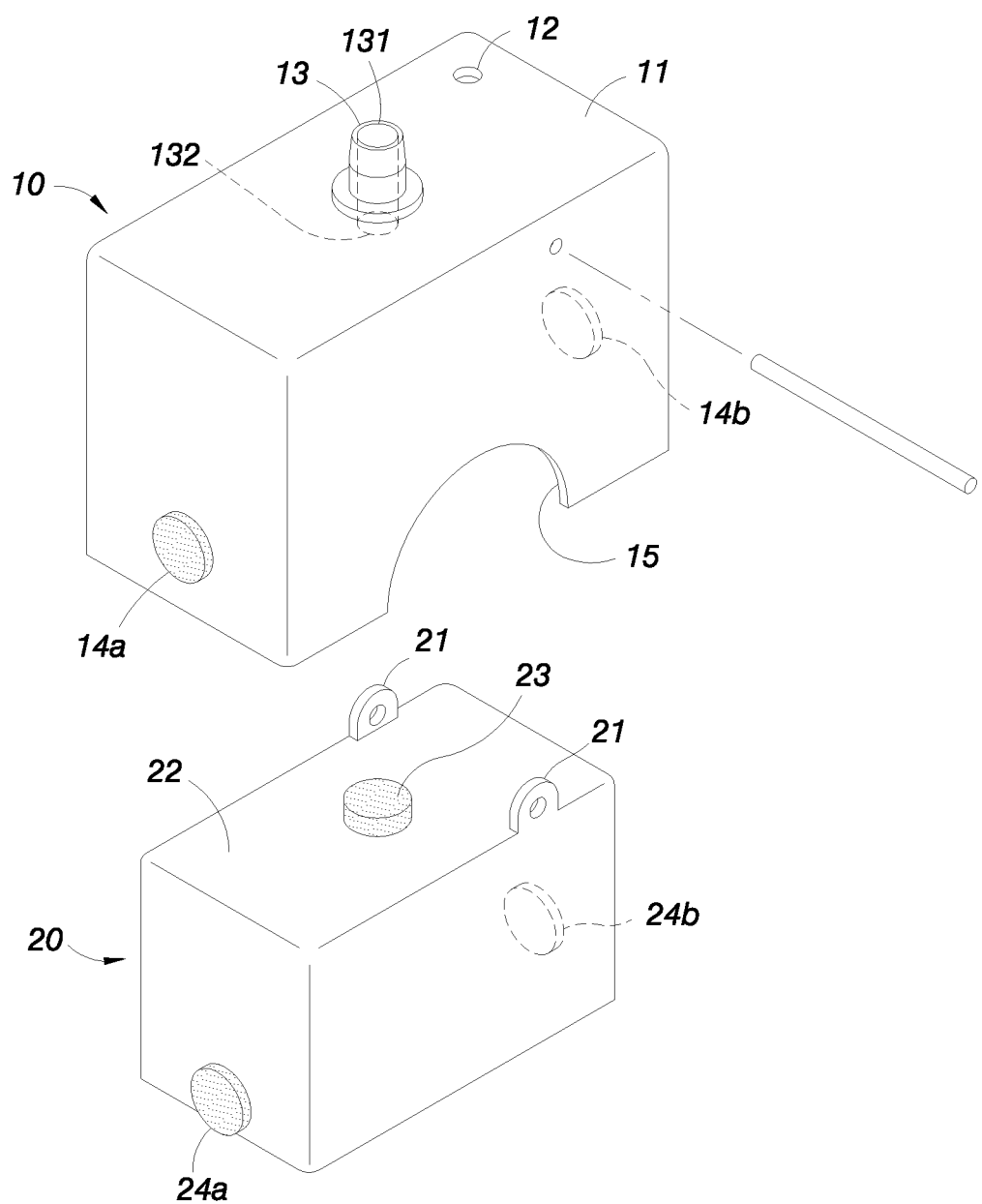
FIG. 1 shows a three-dimensional exploded view of a first embodiment, according to the present invention.
Figure 2:
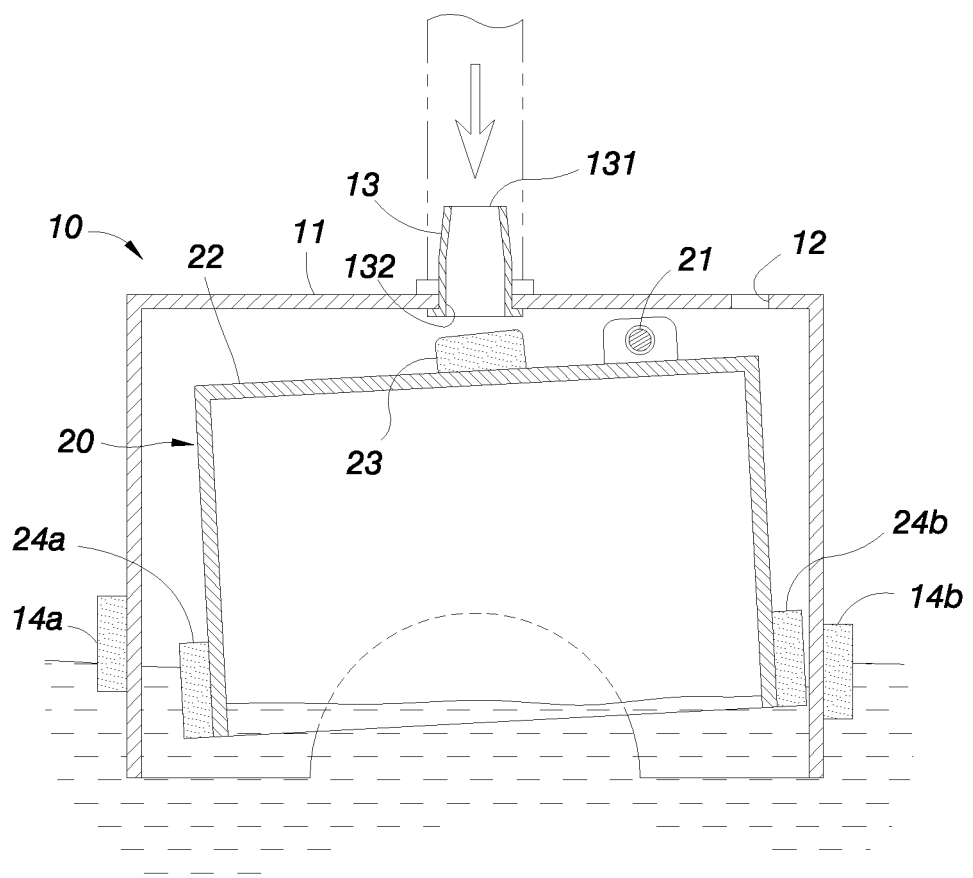
FIG. 2 shows a structural schematic view of the first embodiment, according to the present invention.
Figure 3:
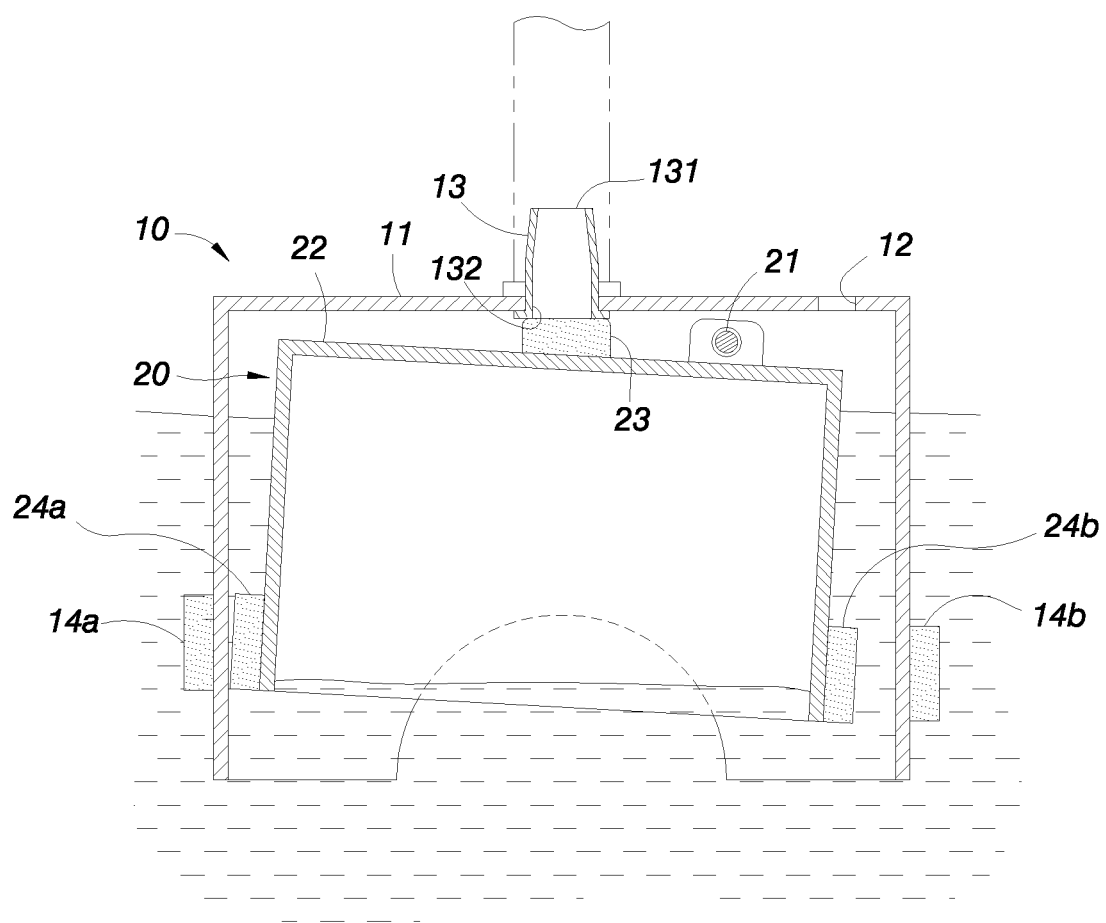
FIG. 3 shows a schematic view of the first embodiment of the present invention at a high water level.

Referring to FIGS. 1 to 3, a first preferred embodiment of the present invention comprises a hollow casing 10 which can be fixed inside a hydroponic cultivation tank (not shown in the drawings), and a float 20 which is pivoted in the casing 10. As shown in the drawings, the casing 10 is in a shape of a hat and is disposed in the hydroponic cultivation tank, a bottom of the casing 10 is opened and is connected with the hydroponic cultivation tank, and a top of the casing 10 is provided with a top board 11. The top board 11 is provided at least with an air vent 12 to connect with atmosphere, as well as an inlet valve 13. Two sides of the casing 10 are provided respectively with a first magnetic attraction element 14a, 14b.

The inlet valve 13 of the casing 10 is provided with a water inlet end 131 for feeding in the culture solution from outside as well as an inlet nozzle 132 which is transfixed into the casing 10. As shown in the drawings, the water inlet end 131 is protruded out of the casing 10 to connect with a culture solution output tube. When the outer culture solution passes through the inlet valve 13 to enter the casing 10, and flows into the hydroponic cultivation tank from a lower side of the casing 10, the water level in the hydroponic cultivation tank will ascend. On the other hand, when the water level in the hydroponic cultivation tank ascends or descends, as the top board 11 of the casing 10 is provided with the air vent 12 to connect with the atmosphere, air in the hat-shaped casing 10 can be expelled to the atmosphere from the air vent 12, or ambient air can be supplemented into the casing 10 through the air vent 12.

The float 20 is in a shape of a hat, with a bottom storing air upon being closed by liquid surface of the culture solution. A side of the float 20 is provided with a pivoting part 21 which is pivoted in the casing 10, allowing the other side of the float 20 to form a movable part 22 which can float and shift upward and downward with the water level of the culture solution against the pivoting part 21.

The movable part 22 of the float 20 is further provided with a seal 23 and two second magnetic attraction elements 24a, 24b, with the seal 23 and the two second magnetic attraction elements 24a, 24b shifting at a same time. The seal 23 is disposed on a top of the float 20 and below the inlet nozzle 132 of the inlet valve 13. The second magnetic attraction elements 24a, 24b, on the other hand, are disposed on two sides of the float 20, each one corresponding to one of the first magnetic attraction elements 14a, 14b respectively.

Referring to FIG. 3, when the movable part 22 of the float 20 shifts upward that the culture solution reaches a high water level, the seal 23 will abut at a bottom of the inlet valve 13 and close the inlet nozzle 132 to stop feeding in water. In a meantime, a second magnetic attraction element 24a will attract the corresponding first magnetic attraction element 14a. Therefore, when the culture solution in the hydroponic cultivation tank reaches the high water level, the outer culture solution will no longer pass through the inlet valve 13 to enter the casing 10, achieving the object of automatically stopping feeding in the culture solution at the high water level. Furthermore, the magnetic attraction between the first magnetic attraction element 14a and the second magnetic attraction element 24a can assist the seal 23 in tightly closing the inlet nozzle 132 of the inlet valve 13.

Referring to FIG. 2, when the water level of the culture solution in the hydroponic cultivation tank keeps descending to the low water level due to absorption by plant or natural evaporation that the gravity of the float 20 is larger than the magnetic attraction between the first magnetic attraction element 14a and the second magnetic attraction element 24a, the float 20 will displace downward automatically due to the gravity; whereas, the second magnetic attraction element 24a will escape from the first magnetic attraction element 14a, allowing the seal 23 to keep moving away from the inlet nozzle 132 of the inlet valve 13. Thus, the culture solution can be supplemented into the hydroponic cultivation tank through the inlet valve automatically.

In addition, for the abovementioned low water level, the float 20 will displace downward automatically due to the gravity. In the meantime, when the second magnetic attraction element 24a escapes from the first magnetic attraction element 14a, the first magnetic attraction element 14b and the second magnetic attraction element 24b on the other side will approach and attract each other due to the displacement of the float 20, which not only assists the seal 23 in moving away from the inlet valve 13, but also allows the float 20 to keep at the low water level for a short time when water starts entering the inlet valve 13, enabling the inlet valve 13 to keep at the largest opening for a short time to feed in water rapidly. When the buoyancy of the float 20 is larger than the magnetic attraction between the first magnetic attraction element 14b and the second magnetic attraction element 24b, the first magnetic attraction element 14b and the second magnetic attraction element 24a on that side will separate from each other, and the float 20 can escape from the low water level position to shift upward, until the culture solution in the hydroponic cultivation tank reaches the high water level. As shown in FIG. 3, the first magnetic attraction element 14a and the second magnetic attraction element 24a on the other side attract each other. Therefore, the culture solution in the hydroponic cultivation tank can keep between the high water level and the low water level automatically.

It needs to describe that although there are two sets of the first magnetic attraction element 14a, 14b and two sets of the second magnetic attraction element 24a, 24b that attract each other at a high water level and a low water level in the drawings, only one set of the element will do in the implementation.

For example, when only the first magnetic attraction element 14a and the second magnetic attraction element 24a are used at the high water level, and the water level descends to a level where the gravity of the float 20 is larger than the magnetic attraction between the first magnetic attraction element 14a and the second magnetic attraction element 24a, the float 20 will displace downward automatically due to the gravity, and the second magnetic attraction element 24a will escape from the first magnetic attraction element 14a. Therefore, the culture solution can be supplemented into the hydroponic cultivation tank through the inlet valve 13 automatically, until the culture solution reaches the high water level again.

Furthermore, in terms of that only the first magnetic attraction element 14b and the second magnetic attraction element 24b are used at the low water level, when the culture solution keeps supplementing into the hydroponic cultivation tank through the inlet valve 13 to raise the water level and the buoyancy of the float 20 is larger than the magnetic attraction between the first magnetic attraction element 14b and the second magnetic attraction element 24b, the float 20 will displace upward automatically due to the buoyancy, and the second magnetic attraction element 24b will escape from the first magnetic attraction element 14b. Therefore, when the culture solution reaches the high water level, the seal 23 can close the inlet valve 13 again as the float 20 exerts an upward force by the buoyancy.

Figure 4:
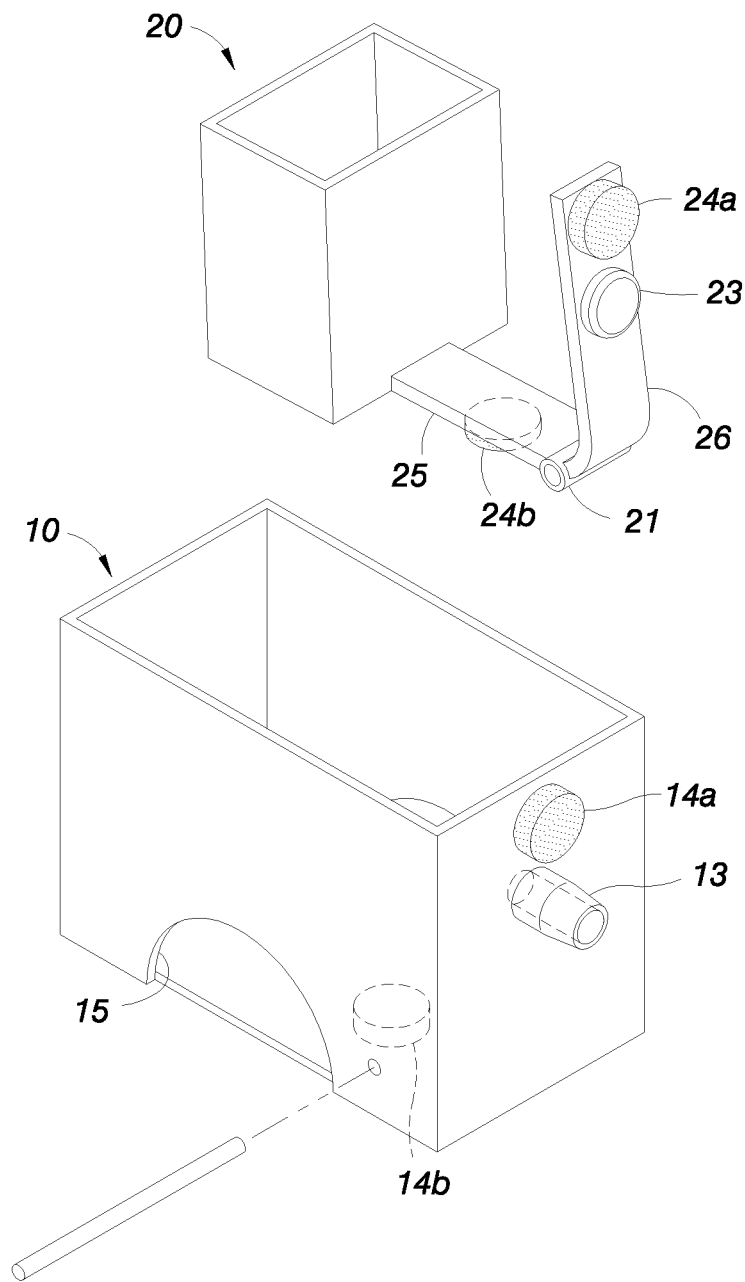
FIG. 4 shows a three-dimensional exploded view of a second embodiment, according to the present invention.
Figure 5:
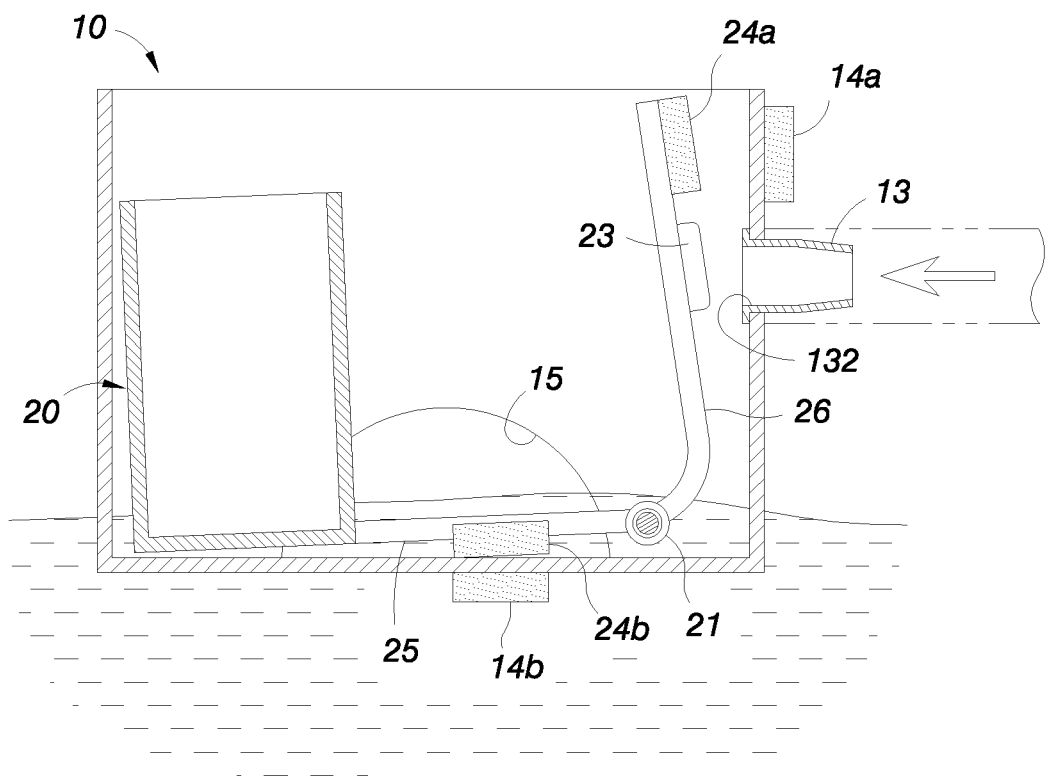
FIG. 5 shows a structural schematic view of the second embodiment, according to the present invention.
Figure 6:
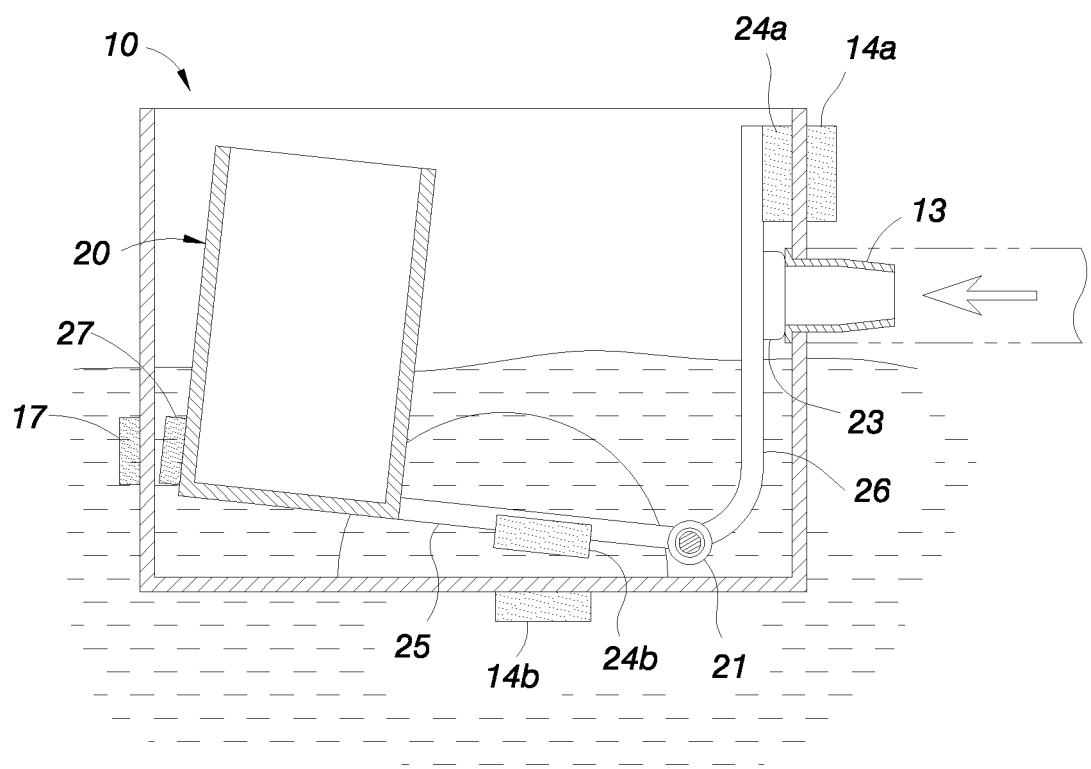
FIG. 6 shows a schematic view of the second embodiment of the present invention at a high water level.

Referring to FIGS. 4 to 6, in addition to that the abovementioned casing 10 is in a shape of a hat, the entire structure of the casing 10 can be also like a scoop. In the drawings, a top of the scoop-shaped casing 10 is opened to atmosphere, and a bottom of the casing 10 is closed and is provided at least with an outlet nozzle 15 to connect with the hydroponic cultivation tank.

In the present preferred embodiment, as the top of the casing 10 is opened, the inlet valve 13 and the first magnetic attraction element 14a can be disposed on an upper part of a same side of the casing 10; whereas, the other first magnetic attraction element 14b is disposed on the bottom of the casing 10.

In order to allow the second magnetic attraction elements 24a, 24b and the seal 23 to approach or move away from the inlet valve 13 and the first magnetic attraction elements 14a, 24a when the float 20 shifts upward and downward, the float 20 in the drawings is extended transversally with a pivoting arm 25 on a side. A tail end of the pivoting arm 25 is provided with the abovementioned pivoting part 21 which is pivoted in the casing 10, and the pivoting part 21 is extended upward with a swinging arm 26. The second magnetic attraction element 24a and the seal 23 are disposed on the swinging arm 26, and the other second magnetic attraction element 24b is disposed below the pivoting arm 25 or the float 20, aligning with the inlet valve 13 and the first magnetic attraction elements 14a, 14b respectively.

Referring to FIG. 5 and FIG. 6, when the movable part 22 of the float 20 shifts upward and downward with the culture solution, the swinging arm 26 can swing against the pivoting part 21, which in turn allows the second magnetic attraction elements 24a, 24b and the seal 23 to approach or move away from the first magnetic attraction elements 14a, 14b and the inlet valve 13, thereby achieving the object of keeping the culture solution in the hydroponic cultivation tank between the high water level and the low water level automatically.

Similarly, although there are two sets of the first magnetic attraction element 14a, 14b and two sets of the second magnetic attraction element 24a, 24b that attract each other at a high water level and a low water level in the drawings, only one set of the element will do in the implementation. Besides that, although the float 20 in the drawings is in a shape of a scoop, with the bottom storing air upon being closed by liquid surface of the culture solution, the float 20 can be a feasible implementation whether it is a hollow geometry with a closed interior part or a non-geometry body (not shown in the drawings).

Figure 7:
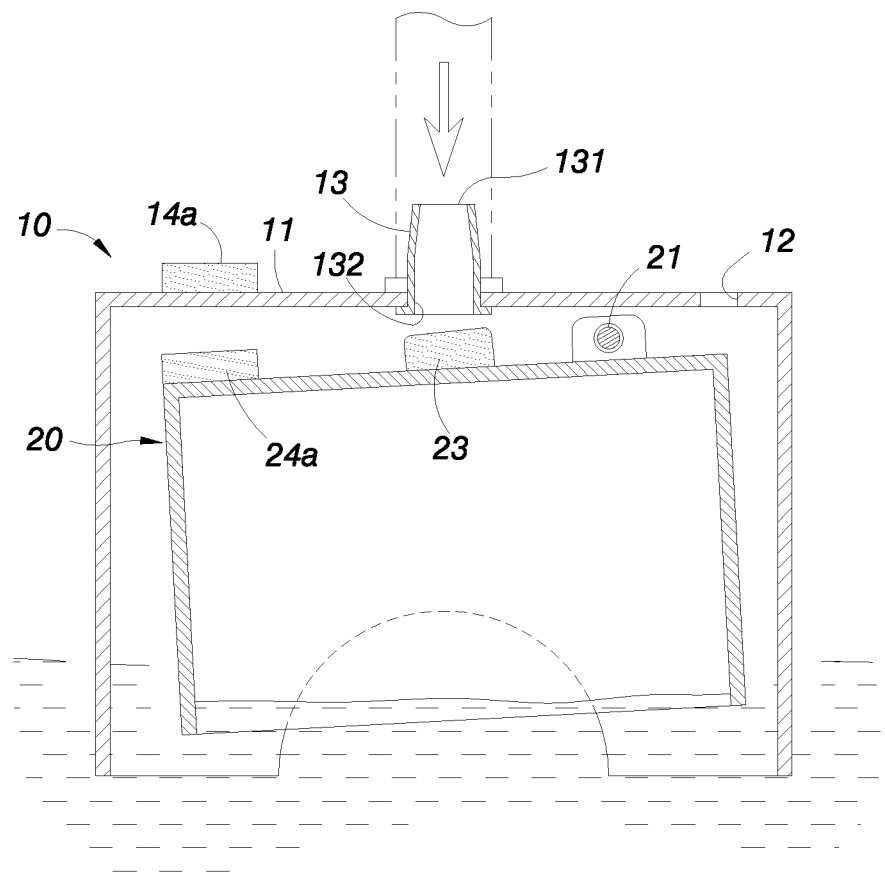
FIG. 7 shows a schematic view of positions on which a first magnetic attraction element and a second magnetic attraction element are disposed, according to the present invention.
Figure 8:
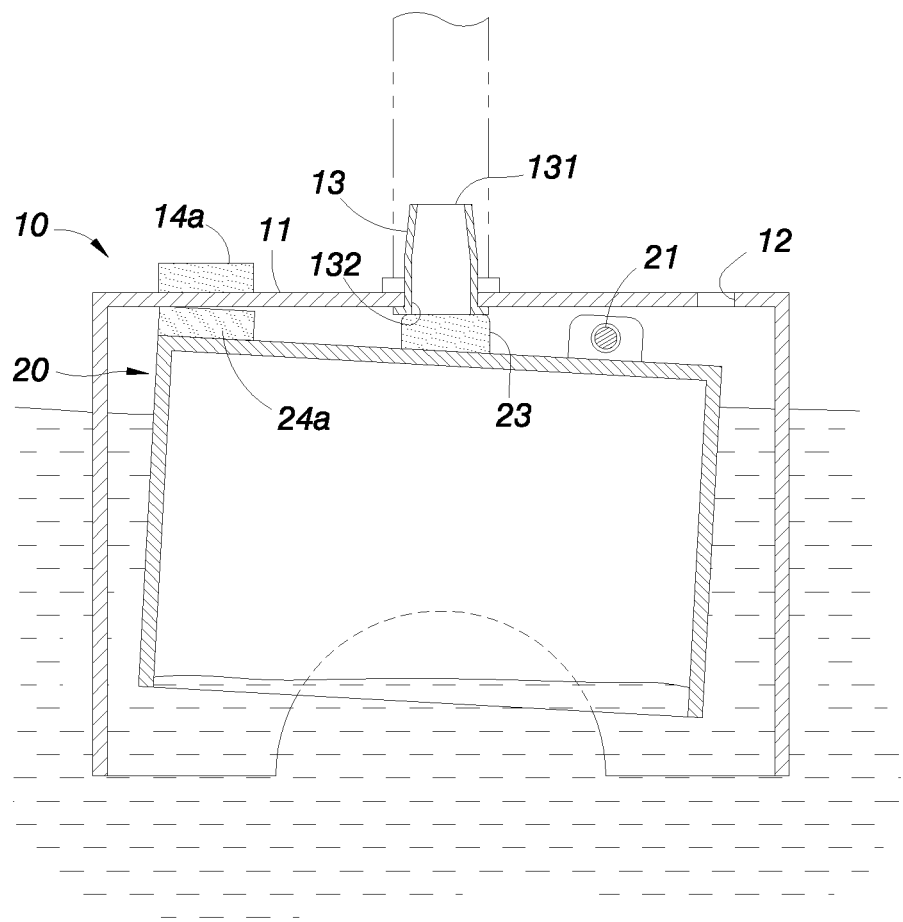
FIG. 8 shows a schematic view that the first magnetic attraction element and the second magnetic attraction element attract each other in FIG. 7.

For example, as shown in FIG. 7 and FIG. 8, the casing 10 and the float 20 are all in a shape of a hat, wherein the first magnetic attraction element 14a and the inlet valve 13 are disposed on the top of the casing 10, and the second magnetic attraction element 24a and the seal 23 are disposed correspondingly on the top of the float 20. When the float 20 shifts upward that the culture solution reaches the high water level, the seal 23 will close the inlet nozzle 132 to stop feeding in water, and the second magnetic attraction element 24a will attract the corresponding first magnetic attraction element 14a upwardly, until the culture solution descends to the low water level that the gravity of the float 20 is larger than the magnetic attraction between the first magnetic attraction element 14a and the second magnetic attraction element 24a. At this time, the float 20 will displace downward automatically due to the gravity, the second magnetic attraction element 24a will escape from the first magnetic attraction element 14a, and the seal 23 will move away from the inlet nozzle 132 of the inlet valve 13. Therefore, the culture solution can be supplemented into the hydroponic cultivation tank through the inlet valve 13 automatically.

It is worthy of mentioning that as shown in FIG. 6, upon implementation, the said float 20 is further provided at least with a magnet 27 which shifts upward and downward simultaneously. The casing 10 is provided with a magnetic induction element 17 on a position corresponding to the magnet 27. When the float 20 is at the high water level or the low water level (the drawing shows the high water level), the magnet 27 will approach the corresponding magnetic induction element 17 which outputs the induction signal, allowing a hydroponic system to count and monitor the utilization, consumption or anomaly of the entire water resource. In implementation, the magnetic induction element 17 can be a reed tube, a reed switch or a Hall IC (Integrated Circuit).

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A water level controller for a hydroponic system, the water level controller comprising:
   a hollow casing which is fixed in a hydroponic cultivation tank;
   a float which is pivoted in the casing to ascend and descend with a water level of a culture solution, wherein a bottom of the hollow casing is connected with the hydroponic cultivation tank, a top of the hollow casing is connected with atmosphere, and the hollow casing is provided with an inlet valve and two first magnetic attraction elements, wherein one first magnetic attraction element is disposed on a side of the hollow casing, the side extending between the top and the bottom of the hollow casing, an other first magnetic attraction element is disposed on the top or the bottom of the hollow casing, the inlet valve is provided with a water inlet end for feeding in the culture solution from outside and an inlet nozzle which is transfixed into the hollow casing, allowing an outer culture solution to enter the hydroponic cultivation tank through the inlet valve to raise the water level;
   a side of the float being pivoted in the hollow casing, so that an other side of the float shifts upward and downward with the culture solution against the pivot point, and the float being further provided with two second magnetic attraction elements and a seal which shift with the float simultaneously;
   the seal being disposed on a location corresponding to the inlet nozzle of the inlet valve to abut at and close the inlet nozzle of the inlet valve when the water level in the hydroponic cultivation tank ascends to a high water level, whereas the seal moves away from the inlet valve when the water level descends to a low water level;
   the two second magnetic attraction elements being disposed on the float at locations corresponding to the two first magnetic attraction elements, with one second magnetic attraction element of the two second magnetic attraction elements shifting with the float simultaneously to approach and attract a corresponding one first magnetic attraction element of the two first magnetic attraction elements to keep the seal closing the inlet valve when the high water level is reached, until the water level in the hydroponic cultivation tank descends to the low water level such that a force of gravity of the float is larger than a force of magnetic attraction between the one second magnetic attraction element of the two second magnetic attraction elements and the one first magnetic attraction element of the two first magnetic attraction elements, enabling the one second magnetic attraction element of the two second magnetic attraction elements to escape from the one first magnetic attraction element of the two first magnetic attraction elements; and
   an other second magnetic attraction element of the two second magnetic attraction elements shifting with the float simultaneously to approach and attract a corresponding other first magnetic attraction element of the two first magnetic attraction elements to keep the seal moving away from the inlet valve when the low water level is reached, until the water level in the hydroponic cultivation tank ascends to the high water level such that the buoyancy force of the float is larger than a force of magnetic attraction between the other second magnetic attraction element of the two second magnetic attraction elements and the other first magnetic attraction element of the two first magnetic attraction elements, enabling the other second magnetic attraction element of the two second magnetic attraction elements to escape from the other first magnetic attraction element of the two first magnetic attraction elements.

2. The water level controller for a hydroponic system, according to claim 1, wherein the inlet valve is disposed on the side of the hollow casing, the float is transversally extended with a pivoting arm toward the inlet valve, a tail end of the pivoting arm is provided with the pivoting part, the pivoting part is extended upward with a swinging arm, and the seal is disposed on the swinging arm; and when the float when the float shifts upward and downward with the culture solution, the swinging arm swinging against the pivoting part, which in turn enables the seal to approach or move away from the inlet valve.

* * * * *